UNITED STATES PATENT OFFICE 2,341,199

TREATMENT OF ANIMAL CARCASSES

Beverly E. Williams, Chicago, Ill., assignor to Industrial Patents Corporation, Chicago, Ill., a corporation of Delaware No Drawing. Application January 6, 1941, Serial No. 373,317

3 Claims. (Cl. 99—174)

This invention relates to the treatment of animal carcasses and wholesale cuts thereof and has to do particularly with a method of treating skinned edible carcasses, such as beef, lamb and veal, to preserve the bloom and freshness of the meat surface.

In the processing of animal carcasses, it is customary to remove the hide from beef, lamb and veal on the killing floor although in the case of veal the hide may be retained thereon until after cooling. The beef carcass is usually cut into sides on the killing floor, whereas the carcasses of the lamb and veal are usually retained in the whole state. The removal of the skin produces a moist meat surface which is susceptible to the action of bacteria and molds, particularly under conditions that tend to cause condensation of moisture on the surface. The carcass is transferred from the killing floor to an adjoining cooler wherein the temperature is maintained above freezing but low enough to inhibit substantial bacterial action. After holding the carcass in the cooler long enough to obtain the desired aging, the product is ready for market.

In preparing the product for wholesale or retail sale, it may be subjected to varying conditions of temperature and humidity in a refrigerator car, loading dock, sales room, or in the process of transfer. The changes in the surrounding atmospheric conditions often cause a condensation of moisture on or an evaporation from the surface. For example, when a carcass is subjected to a warmer humid atmosphere, condensation may occur. On the other hand, when it is introduced into a cold or warmer, less humid atmosphere, evaporation of the surface moisture may take place. The condensation on the surface of the meat tends to form slime, whereas the evaporation may cause drying or other deterioration.

In the patent to Murphy, No. 1,506,599, there is disclosed a method of treating carcasses by covering the warm, skinned carcass with a cloth which is saturated with salt brine and removing the cloth after the carcass is chilled in a cooling room. The brine soaked cloth has a smoothing action on the fat and produces a bleaching effect. The brine soaked cloth does not have a wicking action for keeping the surface of the meat substantially in uniform condition and as a result sliming tends to occur underneath the cloth. Consequently, the brine soaked cloth is removed after about twenty-four hours. In case it is desired to maintain the carcass in the clothed condition until marketing, it is advantageous to cover the clothed carcass with a bag substantially impervious to moisture whereby the humidity between the surface of the carcass and the bag is maintained substantially uniform. The bag, however, does not prevent condensation of moisture on the outside thereof under varying conditions of temperature and humidity. Furthermore, it is necessary to remove the bag before selling the carcass, whereby the surface is exposed to the surrounding atmosphere and the varying temperature and humid conditions thereof.

An important object of the present invention is to provide a more economical, efficient and facile method of treating the surface of animal carcasses to retain the original bloom and freshness.

Another object of the invention is to treat skinned animal carcasses with an improved covering which will maintain the surface of the carcass in a substantially uniform moist condition under varying conditions of humidity and temperature.

A further object of the invention is to prepare the surfaces of animal carcasses whereby the surfaces are maintained in a substantially uniform condition from the time of skinning until the time of retail sale.

In accordance with the present invention, the fresh carcass is clothed either on the killing floor or in the cooler. In the case of beef and lamb, it is preferable to apply the cloth to the freshly skinned carcass on the killing floor although it may be applied after the carcass is partially or completely chilled in the cooler. In the case of veal, on which the hide is left until the carcass is cooled, the cloth may be applied immediately after skinning the cold carcass. However, if the veal carcass is skinned while still retaining the animal heat, the cloth may be applied immediately or after subjecting the carcass to partial or complete cooling in the cooler.

The cloth ordinarily used heretofore in clothing carcasses contains sizing which is added to the cloth in order to facilitate weaving. The sizing comprises starch and wax which fill the interstices of the cloth and render it substantially water repellant and impervious to air. The sizing is not removed by ordinary washing or soaking in salt brine.

An important feature of the present invention is the use of a cloth which has been treated specially to cause desizing and bleaching. A suitable cloth is muslin or beef sheeting. The treatment is performed by subjecting the cloth to water sufficiently hot to remove the sizing, for example, at about the boiling point of the water. The desized cloth is then bleached and sterilized by subjecting it to the action of chlorinated water.

In practicing the invention, the desized cloth is applied to the carcass in direct contact with the skinned surface. Usually the surface is sufficiently moist so that the cloth will adhere and become moist. If necessary the cloth may be partially or completely moistened before application. The cloth may be affixed to the carcass by tying or by suitable fasteners if desired. The cloth may be retained in contact with the carcass until marketed.

The clothing of the carcass in accordance with the present invention provides a means for protecting the carcass from the time of skinning until retail marketing. In the meanwhile the carcass may be handled, shipped, transferred from one cooler to another or from cooler to truck or refrigerator car, whereby the carcass is subjected to varying changes in temperature and humidity. The wicking action of desized cloth keeps the surface of the meat in substantially uniform condition by permitting evaporation from the moist surface of the meat to a dry atmosphere or absorption of moisture which may condense from a humid atmosphere, as the case may be.

The present invention is a simple, efficient and economical method of holding, handling and shipping of dressed carcasses under conditions which have caused considerable difficulty heretofore due to sliming, drying or other deterioration of the meat surface.

Obviously many modifications and variations of the invention hereinbefore set forth may be made without departing from the spirit and scope thereof, and therefore only such limitations should be imposed as are indicated in the appended claims.

I claim:

1. The method of treating animal carcasses which comprises applying to the surface of the skinned carcass a cloth which has been subjected to the action of boiling water for sufficient time to remove the sizing whereby said cloth performs a wicking action to maintain a substantially constant moisture condition on the surface of the meat under varying conditions of temperature and humidity and maintaining said cloth on the surface of the carcass until the meat is marketed.

2. The method of treating animal carcasses which comprises subjecting a cloth containing sizing to a washing treatment with water at temperatures at least about the boiling point of the water and for sufficient time to remove said sizing, applying the desized cloth to the surface of the skinned carcass and maintaining said cloth on the carcass during storage whereby the cloth performs a wicking action to retain the surface of the carcass in a substantially constant moist condition under varying conditions of temperature and humidity.

3. The method of treating animal carcasses which comprises applying to the freshly skinned carcass a cloth which has been desized by subjecting the cloth to the action of water at a boiling temperature for sufficient time to remove the sizing whereby the cloth performs a wicking action to maintain a substantially constant moisture condition on the surface of the meat and thereafter maintaining the clothed carcass under refrigerated storage conditions.

BEVERLY E. WILLIAMS.